Nov. 11, 1969  A. M. PUTETTI  3,477,075
METHOD OF MAKING SET SCREWS
Filed Aug. 19, 1965  3 Sheets-Sheet 1
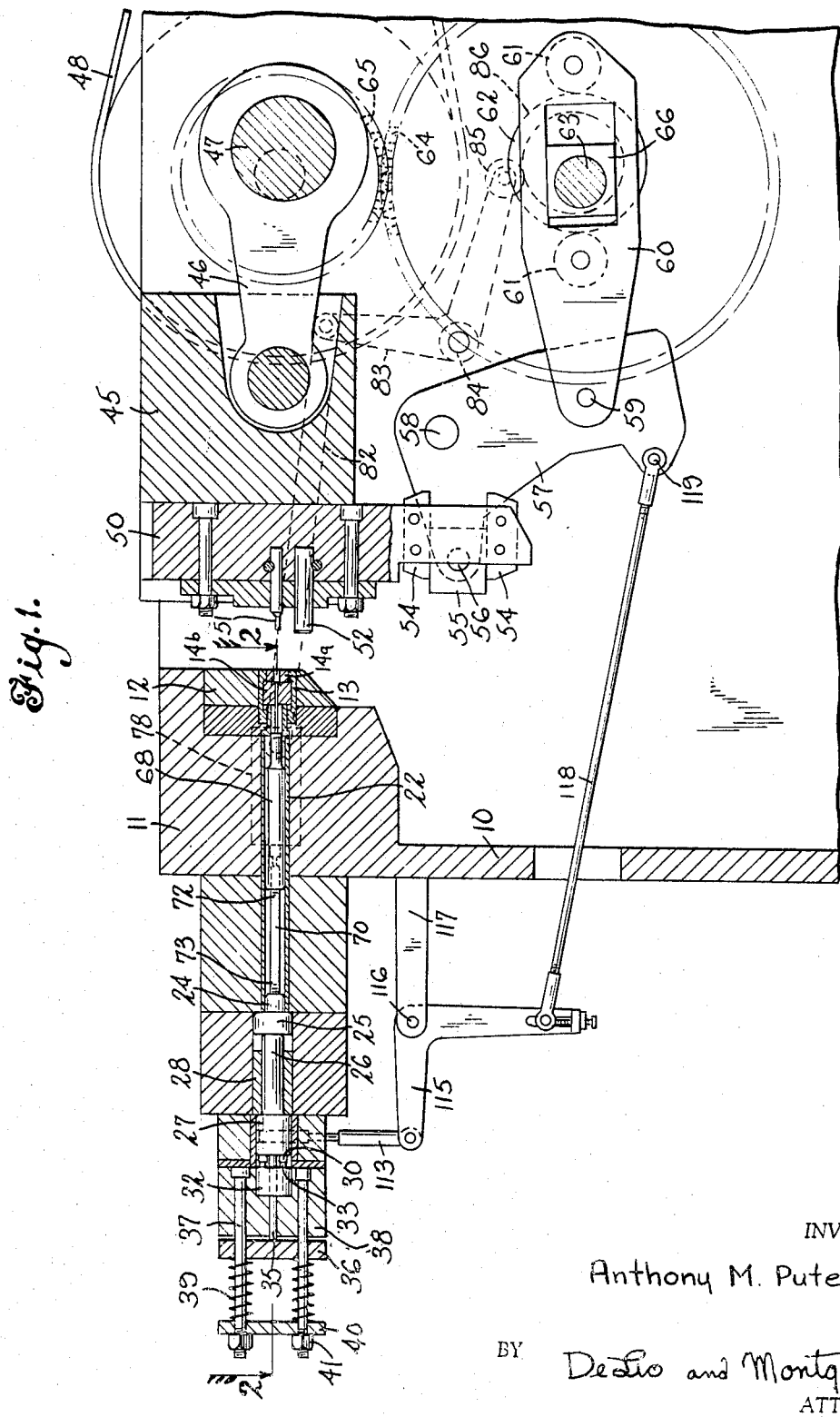
INVENTOR
Anthony M. Putetti
BY DeLio and Montgomery
ATTORNEYS Nov. 11, 1969  A. M. PUTETTI  3,477,075
METHOD OF MAKING SET SCREWS
Filed Aug. 19, 1965  3 Sheets-Sheet 2
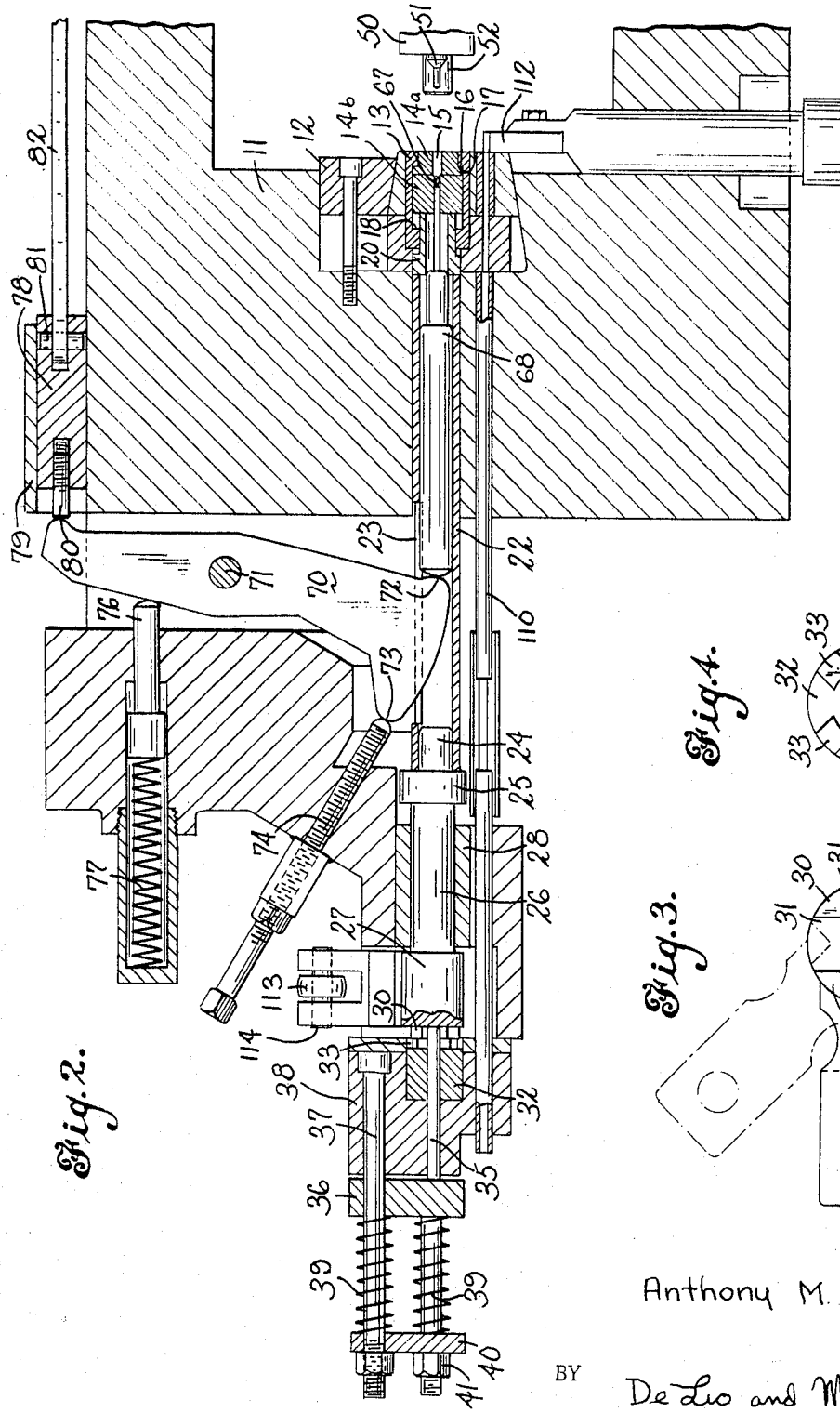
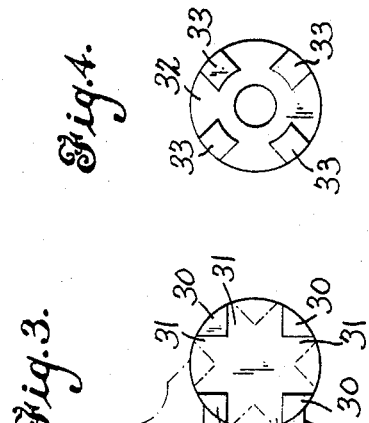
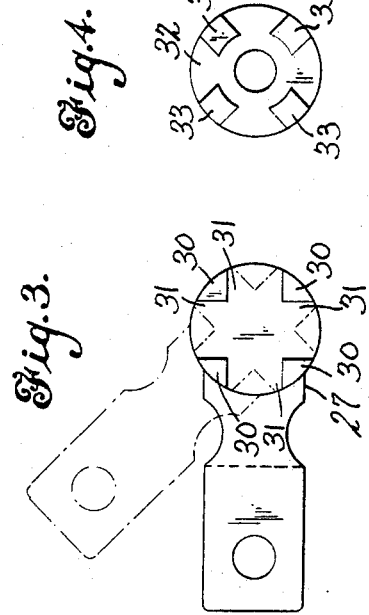
INVENTOR
Anthony M. Putetti
BY
De Lio and Montgomery
ATTORNEYS Nov. 11, 1969 A. M. PUTETTI 3,477,075
METHOD OF MAKING SET SCREWS
Filed Aug. 19, 1965 3 Sheets-Sheet 3
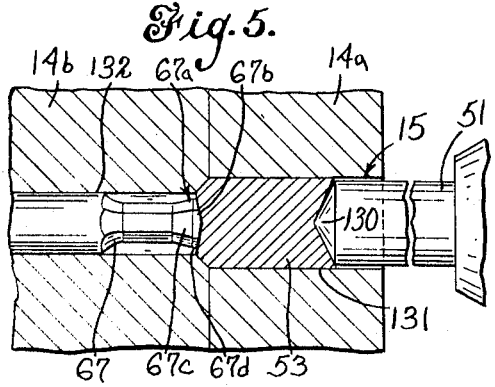
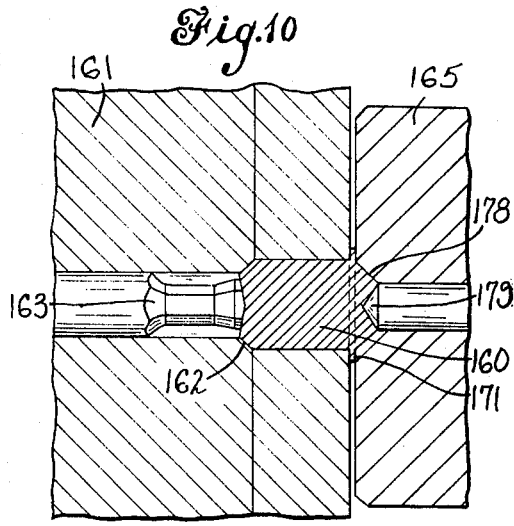
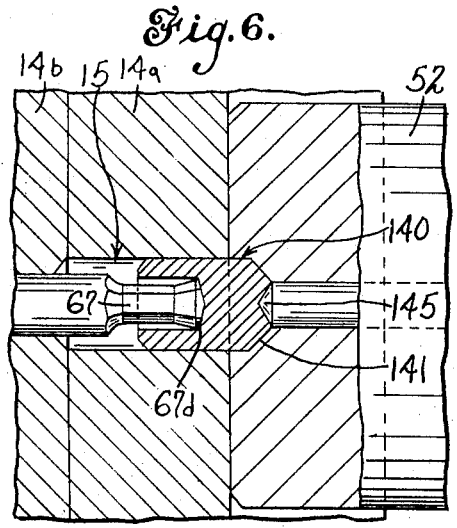
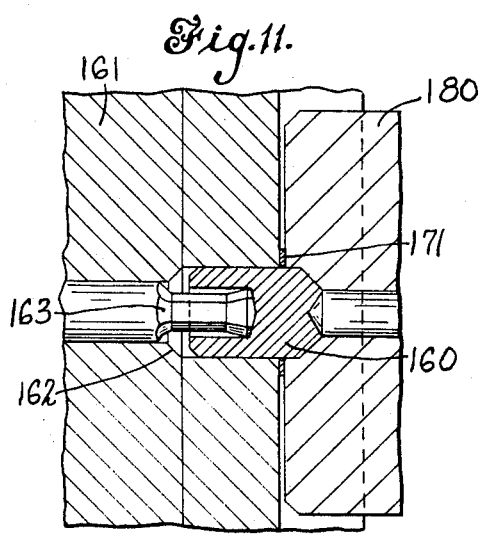
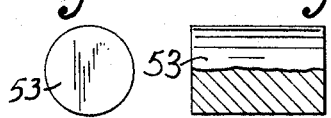
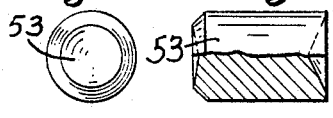
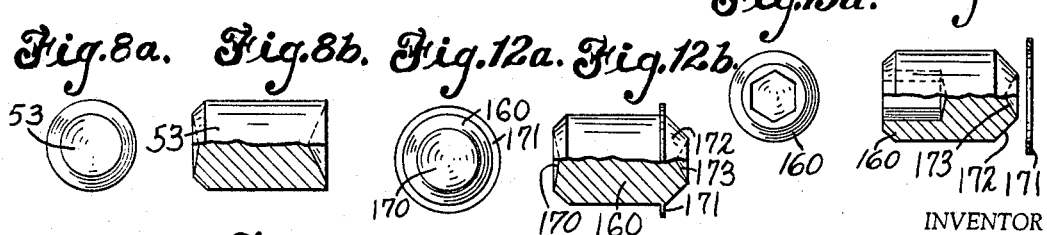
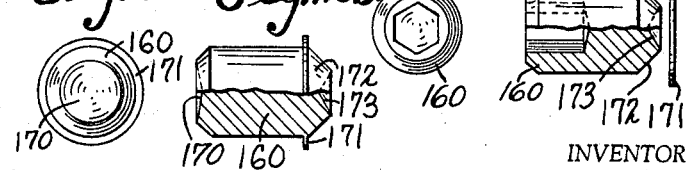
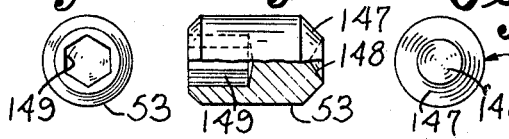
INVENTOR
Anthony M. Putetti
BY
DeLio and Montgomery
ATTORNEYS United States Patent Office 3,477,075
Patented Nov. 11, 1969

3,477,075
METHOD OF MAKING SET SCREWS
Anthony M. Putetti, Waterbury, Conn., assignor to Textron Inc., Providence, R.I., a corporation of Delaware
Filed Aug. 19, 1965, Ser. No. 480,955
Int. Cl. B21k 1/44; B21d 22/20
U.S. Cl. 10—10                    6 Claims

ABSTRACT OF THE DISCLOSURE

A method of making set screws or the like which comprises the steps of inserting the entire length of a two-ended slug into a die shaped to receive said slug slidably, applying pressure to the ends of the slug while it is entirely confined within the die to taper the outside portion of the first end of the slug while, at the same time, indenting the center of the same end of the slug with an extruding pin and simultaneously indenting the second end of the slug, and maintaining a portion of the slug in the same die and forcing the first end of the slug over an extruding pin to extrude a cavity in the slug over at least a portion of its length.

---

This invention relates to methods for fabricating metals and more particularly to a method of making such articles as socket head set screws and the like.

In the prior art there are many methods and apparatus for fabricating metal to produce various articles, including socket head set screws and the like. Of these, the cold-working techniques are the most popular. However, the cold-working techniques of the prior art require multiple die machines and also a minimum of three blows to form socket head set screws. Thus, in order to make set screws by the method of the prior art, expensive and complex equipment is required. Further, the operations performed by the prior art apparatus were slow and time-consuming due to the transfer steps required to move the workpiece between stations.

Accordingly, it is an object of this invention to provide a new and improved method for forming metal articles.

Another object of this invention is to provide a new and improved method for forming set screws and the like.

A further object of this invention is to provide a new and improved method for making set screws and the like whereby the necessary operations may be performed in a single die in cooperation with a pair of punches which effect extrusion of the workpiece.

Still other objects and advantages of the invention will in part be obvious and will in part appear hereinafter.

The invention accordingly comprises the several steps and the relation of one or more of such steps with respect to each of the others.

For a fuller understanding of the nature and objects of the invention reference should be had to the following detailed description taken in conjunction with the accompanying drawings, in which:

FIG. 1 is a vertical sectional view of a single die, double-blow header;

FIG. 2 is a horizontal sectional view taken along line 2—2 of FIG. 1;

FIG. 3 is a detailed view of a movable lever for controlling the position of the die according to this invention;

FIG. 4 is a view of the face of the abutment which cooperates with the movable lever of FIG. 3;

FIG. 5 is an enlarged vertical sectional view taken through a single die showing the position of the tools during the first step in forming the workpiece;

FIG. 6 is a similar view showing the position of the tools during the second step;

FIG. 7a is an end view of a workpiece prior to the first forming step;

FIG. 7b is a longitudinal view of the workpiece of FIG. 7a partially in section;

FIG. 8a is an end view of the workpiece after the first forming step of FIG. 5;

FIG. 8b is a side view of the workpiece of FIG. 8a and partially in section;

FIG. 9a is an end view of the workpiece after the second forming step of FIG. 6;

FIG. 9b is a side view of the workpiece of FIG. 9a partially in section;

FIG. 9c is an end view of the workpiece of FIG. 9b;

FIG. 10 is an enlarged vertical sectional view taken through a single die showing the position of the tools during the first operation in forming a workpiece, according to an alternate embodiment of the invention;

FIG. 11 is a view similar to FIG. 10, showing the position of the tools during the second step, according to the alternate embodiment of the invention;

FIG. 12a is an end view showing the shape of the end of the workpiece after the step of FIG. 10;

FIG. 12b is a side view partially in section of the workpiece of FIG. 12a;

FIG. 13a is an end view of the workpiece after the step of FIG. 11; and

FIG. 13b is a side view partially in section of the workpiece of FIG. 13a and further showing a flash removed therefrom.

To illustrate the preferred embodiment of the invention, there is shown in FIGS. 1 and 2 a heading mechanism comprising the supporting structure 10 upon which there is mounted a die bed 11. At the face of the die bed 11 is mounted a die block 12 in which is secured a die holder 13 within which is movably mounted working die sections 14a and 14b having a die opening 15 therein. The working die is preferably fabricated in sections because of ease of manufacture, although it is to be understood that the die could be fabricated as one piece.

The die holder 13 is shouldered at 16 and the die section 14a is provided with a cooperating shoulder 17 to limit the movement of the die in a forward direction. The die holder 13 is provided adjacent its rear end with an inwardly-directed flange 18 which serves as a stop for the movement of the die in the other direction.

A shouldered sleeve member 20 is provided in the die block 12 and the forward face of this member rests against the rear face of die section 14b. Abutting the rear face of the sleeve 20 is a long sleeve 22 which extends through the die bed 11 and is provided with a longitudinally elongated opening 23 in its upper face. Mounted in the rear end of this sleeve is a short pin 24 having a head 25 against which impinges the elongated body portion 26 of the die controlling member 27. It is understood that the member 27, together with its body portion 26, is mounted for rotation between two positions in a portion of the supporting structure and is embraced by a sleeve member 28 within which it rotates.

The member 27, as shown in FIG. 3, is provided upon its rear face with a plurality of projections 30, between which projections are recesses 31. Cooperating with the controlling member 27 is a sleeve-like plug 32 (FIGS. 1 and 2) also having a plurality of spaced projections 33 upon its forward face. These projections are so spaced that they may lie opposite each other so that when the member 27 is rotated the projections of one member will lie within the recesses between the projections of the other member. It will thus be seen that when the projections lie opposite each other the sleeve 22 will be held in its forward position and thus hold the die sections 14a and 14b in its forward position against shoulder 16 while, when member 27 has been rotated to the dotted position shown in FIG. 3, the projections 33 will be received in the recesses 31 and permit the die sections 14a and 14b to move rearwardly.

It will be understood that the die sections 14a ad 14b will move rearwardly by the pressure of the second punch upon the workpiece when the controlling member 27 is in the position shown dotted in FIG. 3. In order to reposition the die sections 14a and 14b after completion of the forming steps, there is provided means comprising a pushpin 35 extending through the plug 32. This pin bears at its forward end against the member 27 and at its rear end against a block 36 slidably supported upon rods 37 secured in a supporting member 38. There are provided resilient biasing means such as springs 39 surrounding the rods 37 which act upon the member 36 to urge the pin 35 in a forward direction against the member 27, thus moving the sleeve 22 and die sections 14a and 14b forwardly. The springs 39 bear at their rear ends against an abutment 40 held upon the rods 37 by nuts 41.

Referring more particularly to FIG. 1, a gate 45 is slidably mounted upon the supporting bed 10 of the machine. This gate is reciprocated by means of a pitman 46 mounted eccentrically upon a shaft 47 driven in any suitable way such as by the pulley 48 which, in turn, may be driven by any suitable source of power. Slidably mounted for vertical movement on gate 45 is a punch carrier 50 to which there are fixedly secured punches 51 and 52 designed to cooperate upon alternate strokes of the gate with the die sections 14a and 14b. As shown more especially in FIGS. 5 and 8, the punch 51 forms a partial or cone-shaped cavity on one end of the workpiece or slug 53, forces the workpiece 53 against a piercing pin to be hereinafter described to indent the workpiece, and also forces the workpiece against the shoulder of the die section 14b to taper the indented end of the workpiece. The punch 52 completes the formation of the workpiece by driving the workpiece and the die sections 14a and 14b rearwardly against the piercing pin to extrude the metal of the blank rearwardly about the pin and form the hollow body within the blank, at the same time tapering the end of the workpiece opposite the extruded end of the workpiece. This is more clearly shown in FIGS. 6 and 9.

The punch carrier 50 is mounted to slide in the gate in a vertical direction and is shifted from one position to another upon alternate strokes of the gate. In order to provide the motion required to drive the punch carrier in a vertical direction, there are provided spaced guide blocks 54 mounted on the carrier. Positioned between these guide blocks is a block 55 to which is provided at 56 one arm of a bell-crank lever 57 pivoted on the supporting bed at 58. To the other arm of the bell-crank lever is pivoted at 59 a slide 60 having spaced-apart cam follower rollers 61 thereon. These rollers are adapted to be engaged by cam disc 62 mounted eccentrically upon a shaft 63 which is rotated by means of a gear 64 secured thereon, the teeth of which mesh with gear 65 secured on shaft 47. It will therefore be seen that upon rotation of the shaft 47, the gate will be reciprocated by the pitman 46 in timed relation therewith. The punch carrier 50 will also be vertically reciprocated by the bell-crank lever 57 to prevent first one punch and then the other to the die upon alternate strokes of the gate. The slide 60 may be guided by a block 66 mounted on the shaft 63.

Referring now particularly to FIGS. 2, 5 and 6, a piercing pin 67 is mounted within the sleeve 20 and the die section 14b and extends forwardly so that its end extends within the die opening 15. Inasmuch as the machine is utilized to (preferably) form hexagonal socket head set screws, the pin 67 is of the type having a hexagonal tip with a conical outer ending. The pin 67 is (preferably) tapered at 67a, beginning at the onset of the conical ending 67b, to form a portion of a pyramid 67c.

In this manner, the six-sided extrusion is more easily formed in the workpiece since only the surface shown at 67d is in contact with the interior of the workpiece 53 during the extruding operation. The use of this type of shaped pin reduces the amount of friction between the sides of the pin 67 and the interior of the workpiece during the extruding operation.

The pin 67 may, as shown, be formed integrally with a rod 68 slidably mounted within the sleeve 22. The rear end of rod 68 extends to a position below the opening 23 in the sleeve 20. A lever 70 pivoted to the supporting frame at 71 extends within the slot or opening 23 and a nose 72 of this lever engages the rear end of the rod 68. The lower end of lever 70 is provided with a nose portion 73 which abuts a stop screw 74 threadedly mounted in the supporting base. The position of screw 74 determines the rearward limit of the position of the extruding pin 67 and the screw may be adjusted for workpieces of varying lengths. The back portion of the lever 70 above its pivot 71 is engaged by a plunger 76 spring-pressed forwardly by spring 77 which normally urges the nose 73 into engagement with the stop screw 74.

It will be understood that the extruding pin 67 not only serves to pierce or extrude the workpiece when the latter is forced inwardly and the metal thereof extruded, but also serves to eject the workpiece from the die. The pin 67 is propelled forward by means of a plunger 78 slidably mounted in a casing 79 mounted on the die bed 11. This plunger is provided with an adjusting bolt 80 which engages the upper end of lever 70. Pivoted at 81 to plunger 78 is one end of a link 82, the other end of which is pivoted to a bell-crank lever 83, shown in FIG. 1. This lever is pivoted to the supporting base at 84 and at the end of its other arm carries a cam follower roller 85 adapted to engage a cam 86 eccentrically mounted on the shaft 63, heretofore referred to.

It will therefore be seen that the plunger 78 will move the nose 72 of the lever forwardly to advance the extruding pin 67 to eject the work from the die in timed relation to the movement of the gate. It may also be noted that the gears 64 and 65 are so dimensioned that the former makes one revolution for every two revolutions of the latter, so that two strokes of the gate will be effected and therefore two operations performed on the workpiece 53 before it is ejected from the die sections 14a and 14b. In order to carry the ejected workpiece away from the die sections, the usual stripper type member or apparatus may be provided in the known manner of the prior art.

In order to provide a slug or workpiece to the die sections, there is shown in FIG. 2 a wire or rod stock feed mechanism tube 110. This tube is adapted for receiving wire or rod stock fed to the machine from another apparatus. A wire stop may be provided in the usual manner to determine the length of the workpiece. The workpiece is then cut off by a severing member shown at 112 and transferred by this member to a position in front of the opening 15 of the die section 14a. The workpiece is forced into the opening 15 by the action of the first punch 51 pushing the workpiece from member 112 into the opening 15.

The manner in which the position of the die sections 14a and 14b is controlled by member 27 has been previously described. The member 27 is moved from one position to the other, that is to say, from the dotted to the undotted position of FIG. 3, by means of an adjustable rod 113 pivoted at one end to the member 27 at 114. This is more clearly shown in FIG. 1. The other end of this rod is pivoted to one end of a bell-crank lever 115 which is pivoted at 116 to a bracket 117 on the frame. The other end of this lever is pivotally connected to a link 118. The other end of the link 118 is pivoted at 119 to the lever 57 which, as previously described, is rocked in both directions about its pivot 58 by the cam disc 62 and the cam roller 61. Therefore the control member 27 for holding the die in its forward position or to permit it to be retracted to its rearward position to permit extrusion to take place, will be shifted to the latter position once upon every alternate reciprocation of the gate. Thus there is provided a means for holding the die in its forward position and subsequently unlocking the die so that it may move rearwardly upon contact with the second punch.

While the operation of the apparatus and the method of making a set screw will be clear from the foregoing description, it is now briefly described for the purpose of clarity, by reference to FIGS. 5–9, along with FIGS. 1 and 2 previously described.

A workpiece is cut off from a length of stock by the severing member 112 and transferred to a position in front of the die section 14a. The parts of the apparatus are in the position shown in FIG. 2 and the punch as shown in FIG. 1 is opposite the die opening 15. Upon the advance of the gate 45, the punch 51 strikes the workpiece and forces it into opening 15 of the die sections 14a and 14b, as shown in FIG. 5. This punch is dimensioned and shaped such that it may enter the opening 15 and has a conical tip, shown at 130, for forming an inwardly going tapered conical region within the workpiece 53. At the same time, by forcing the workpiece 53 into die sections 14a and 14b, the punch causes the workpiece to be indented by the tip of the extruding pin 67 and at the same time to be tapered by tapered wall portions separating a cavity 131 within die secion 14a from a smaller cross-sectional cavity 132 within die section 14b. In FIGS. 7a and 7b there is shown the workpiece or slug prior to its entering the die and in FIGS. 8a and 8b there is shown the workpiece after the first punch operation shown in FIG. 5. During the operation of FIG. 5, the die sections are held positively in a forward direction due to the position of the member 27 restraining the sleeve 20. The extruding pin is also locked in position, as shown in FIG. 5, by the action of the lever 70 against the member 68 to which the extruding pin 67 is attached.

The gate is now retracted and the punch carrier 50 is shifted on the gate to withdraw the punch 51 and bring punch 52 into registration with die opening 15. At this time the control member 27 is moved to the dotted position shown in FIG. 3, wherein the projections 33 register with the recesses 31 of member 27 so as to permit rearward movement of the die sections 14a and 14b in the die block against the action of the springs 39. The shifting of the punch carrier and also the shifting of the control member 27 are both effected by the movement of lever 57 actuated by cam 62, as previously described.

Upon the second advance of the gate, the punch 52 engages the workpiece moving the die rearwardly from the position shown in FIG. 5 against the action of the springs 39. This causes the metal of the workpiece to be extruded around the end of the extruding pin 67 to form a hollow, hexagonal body, the die coming to rest against the flange 18, shown in FIG. 2.

The punch 52 has a cavity 140 at its face with an opening of substantially the same cross-sectional area as the opening 15. The rear of the cavity 140 has an inwardly tapering shoulder portion 141. At the terminus of the shoulder portion 141 a conically tapered member 145 is provided which extends into the cavity toward the face of the punch 52. Thus, the punch 52, will upon advancing on the workpiece, taper an end of the workpiece at 147 by the action of the shoulder portion 141, while the member 145 will enter the indent formed by the punch 51 and further indent the same end at 148. The hexagonal extrusion is shown at 149 in FIGS. 9a and 9b.

Although the punch 52 is shown in FIG. 6 as having a cavity portion 140 and a tip 145 which is fabricated separately, it is to be understood that the punch 52 can be formed from a single block of material, if desired.

When the gate is again withdrawn, the link 82 is moved toward the left, as shown in FIG. 2, to advance extruding pin 67 to eject the work from the die while, at the same time, the punch 52 is returned to its original position. In this manner, a preferably cylindrical workpiece is formed into a socket head set screw within a single die with two blows.

Referring now to FIGS. 10, 11, 12a, 12b, 13a and 13b, there is shown an alternate method and apparatus for forming socket head set screws according to this invention. In this alternate embodiment, a workpiece 160 is partially positioned within the die 161 having a tapered wall section 162. Positioned at the bottom of the section 162 is an extruding pin 163 which is of the same type as extruding pin 67 previously described. During the first operation, a nose punch 165 is brought to bear against one end of the workpiece 160, such that a tip of the workpiece is indented at 170 by the extruding pin 163 while, at the same time, the nose punch 165, due to its shape, forms a flash 171, a taper 172 and a conical indentation 173 in the workpiece. This is more clearly shown in FIGS. 12a and 12b. The nose punch 165 comprises a tapered cavity 178 having at its center a conically pointed member 179. During the operation of the nose punch 165, a flash is formed, inasmuch as the nose punch does not enter into the interior of the die opening, as is the case for the preferred embodiment.

Upon the advance of a second nose punch 180 against the workpiece 160 and the unlocking of the die 161, as described with reference to the preferred embodiment, the workpiece will be extruded by the pin 163 due to the movement of the die while the extruding pin remains stationary. At the same time, nose punch 180, which is of substantially the same shape as the punch 52 described in the preferred embodiment, will remove the flash 171 while simultaneously forcing itself against the taper 172 and the conical opening 173 previously formed by the first punch 165.

The alternate embodiment is preferred if it is desirable that the points formed at the angle between taper 172 and the conical indentation 173 must, necessarily, be of a particular sharpness. Thus, again, a set screw is formed by the use of a single die machine using only two punch operations.

It may also be observed from FIGS. 10 and 11 that the workpiece is not completely inserted into the die during the forming operation. Thus the depth of the working portion of the die 160 is less than the length of the workpiece to be formed.

Although a preferred alternate embodiment has been described for forming hexagonal shaped set screws, it is to be understood that other set screw shapes may be formed without departing from the spirit and scope of this invention.

It will thus be seen that the objects set forth above, among those made apparent from the preceding description, are efficiently attained and since certain changes may be made in carrying out the above method and in the construction set forth without departing from the scope of the invention, it is intended that all matter contained in the above description or shown in the accompanying drawings shall be interpreted as illustrated and not in a limiting sense.

It is to be understood that the following claims are intended to cover all the generic and specific features of the invention herein described and all statements of the scope of the invention which, as a matter of language, might be said to fall therebetween.

What is claimed is:

1. A method of making set screws or the like which comprises the steps of
   (a) inserting the entire length of a two-ended slug into a die shaped to receive said slug slidably,
   (b) applying pressure to the ends of the slug while it is entirely confined within the die to taper the outside portion of the first end of the slug,
      (1) while at the same time indenting the center of the same end of the slug with an extruding pin,
(2) and simultaneously indenting the second end of the slug, and
(c) maintaining a portion of the slug in the same die and forcing the first end of the slug over an extruding pin to extrude a cavity in the slug over at least a portion of its length.

2. The method according to claim 1 wherein, during step (c), the second end of the slug is tapered.

3. A method of making set screws or the like, which comprises the steps of
(a) inserting a portion of the length of a two-ended slug into a die shaped to receive said slug,
(b) applying pressure to the ends of the slug to taper the outside portion of the first end of the slug,
(1) while at the same time indenting the center of the same end of the slug with an extruding pin,
(2) and simultaneously tapering and indenting the second end of the slug whereby a flash is formed against a face of the die, and
(c) forcing the first end of the slug over said extruding pin while simultaneously removing the flash formed in the previous step.

4. The method according to claim 2, in which the second end of the slug which is tapered during step (c) simultaneously has a conical portion formed therein.

5. A method of making set screws or the like, comprising the steps of
(a) inserting at least a portion of a blank into a die shaped to receive said blank slidably,
(b) applying pressure to the ends of the blank by means of a first punch at a first end and an extruding pin and die portion at a second end to form a conical portion at the second end of the blank while, at the same time, indenting the center of the second end of the blank with the extruding pin and simultaneously forming a recess at the first end of the blank with the first punch,
(c) ejecting a portion of the blank from the die so that said first end of the blank is beyond the face of the die, and
(d) applying pressure with a second punch to said first end of the blank to force the second end of the blank over an extruding pin to extrude a socket at said second end of the blank and simultaneously forming a conical portion at said first end of the blank.

6. The method of claim 5, wherein in step (d) the first end of the blank is simultaneously tapered.

References Cited
UNITED STATES PATENTS

| | | | |
|---|---|---|---|
| 2,038,543 | 4/1936 | Clouse | 10—24 |
| 2,593,126 | 4/1952 | Estok | 10—12.5 |
| 2,689,359 | 9/1954 | Friedman | 10—24 XR |
| 3,200,423 | 8/1965 | Byam et al. | 10—12.5 |

LEONIDAS VLACHOS, Primary Examiner

U.S. Cl. X.R.

10—2, 12, 27